(12) United States Patent
Fukushima et al.

(10) Patent No.: US 7,065,570 B2
(45) Date of Patent: Jun. 20, 2006

(54) SYSTEM, METHOD, COMPUTER PROGRAM, AND RECORDING MEDIUM FOR MACHINE-MANAGEMENT

(75) Inventors: Hidetada Fukushima, Tokyo (JP); Hisashi Moritoki, Tokyo (JP); Tomio Fuchiwaki, Tokyo (JP); Iwaharu Kawada, Tokyo (JP); Nobuyuki Arashima, Tokyo (JP); Masatomo Watanabe, Tokyo (JP); Yuji Kusayanagi, Tokyo (JP); Masaru Kakihara, Tokyo (JP); Osamu Yamazaki, Tokyo (JP)

(73) Assignee: Komatsu Ltd., Tokyo (JP)

( * ) Notice: Subject to any disclaimer, the term of this patent is extended or adjusted under 35 U.S.C. 154(b) by 904 days.

(21) Appl. No.: 09/900,490

(22) Filed: Jul. 9, 2001

(65) Prior Publication Data

US 2002/0046048 A1    Apr. 18, 2002

(30) Foreign Application Priority Data

Jul. 11, 2000  (JP) ............................. 2000-209871
Jul. 11, 2000  (JP) ............................. 2000-209872

(51) Int. Cl.
*G06F 15/173* (2006.01)

(52) U.S. Cl. ..................... 709/223; 700/109; 702/108
(58) Field of Classification Search ................ 709/224, 709/223; 700/108–109; 702/184; 714/47; 705/8

See application file for complete search history.

(56) References Cited

U.S. PATENT DOCUMENTS

| | | | |
|---|---|---|---|
| 5,210,704 A | * | 5/1993 | Husseiny ..................... 702/34 |
| 5,737,227 A | | 4/1998 | Greenfield et al. ...... 364/464.1 |
| 5,754,451 A | | 5/1998 | Williams ............... 364/551.01 |
| 5,968,371 A | | 10/1999 | Verdegan et al. ........... 210/739 |

(Continued)

FOREIGN PATENT DOCUMENTS

EP     0 836 159     4/1998

(Continued)

OTHER PUBLICATIONS

Partial European Search Report dated Jun. 20, 2003.

(Continued)

*Primary Examiner*—Abdullahi Salad
(74) *Attorney, Agent, or Firm*—Westerman, Hattori, Daniels & Adrian, LLP.

(57) ABSTRACT

A management system of a machine equipped with a driving-power source reads out maintenance conditions from a storage means of maintenance management information when data and conditions, concerned about a maintenance management of a machine, the features of the machine, and so on, including the maintenance conditions, are inputted from the input means. Then, information about predicted maintenance management under a certain operation time of the machine is predicted with reference to the maintenance conditions. Subsequently, the information about the predicted maintenance management is represented on a display means. Furthermore, a maintenance predicted value is previously stored in a data base or the like with respect to the maintenance within an operation time under the contract or within a contract term for each of a plurality of contract ranks. A maintenance actual result value of the machine being entered is accumulatively stored. After a termination of the maintenance contract of the machine, the maintenance predicted value that corresponds to a model and a contract rank of the machine is read out, and simultaneously the maintenance actual result value of the machine is read out, followed by making a judgment whether the maintenance actual result value is larger or smaller than the maintenance contract predicted value.

8 Claims, 17 Drawing Sheets

MODEL-SPECIFIC MAINTENANCE RANK TABLE

| CONTRACT RANK / MODEL | R 1 | R 2 | R 3 | R 4 |
|---|---|---|---|---|
| A | 50,000 | 50,000 | 50,000 | 100,000 |
| B | 35,000 | 50,000 | 65,000 | 80,000 |
| C | | | | |
| D | | | | |

| | | | | |
|---|---|---|---|---|
| X | | | | |
| Y | | | | |
| Z | | | | |

290

U.S. PATENT DOCUMENTS

| | | | |
|---|---|---|---|
| 6,138,056 A * | 10/2000 | Hardesty et al. | 700/174 |
| 6,243,628 B1 * | 6/2001 | Bliley et al. | 701/29 |
| 6,311,093 B1 * | 10/2001 | Brown | 700/95 |
| 6,591,157 B1 * | 7/2003 | Vivirito et al. | 700/175 |
| 6,728,660 B1 * | 4/2004 | Bjornson | 702/185 |
| 6,785,586 B1 * | 8/2004 | Toprac et al. | 700/175 |
| 6,832,205 B1 * | 12/2004 | Aragones et al. | 705/10 |
| 6,836,698 B1 * | 12/2004 | Fujishima et al. | 700/169 |
| 6,842,776 B1 * | 1/2005 | Poisner | 709/208 |
| 2001/0001851 A1 * | 5/2001 | Piety et al. | 702/184 |
| 2001/0032109 A1 * | 10/2001 | Gonyea et al. | 705/8 |
| 2005/0111628 A1 * | 5/2005 | Beamon | 379/27.01 |

FOREIGN PATENT DOCUMENTS

| | | |
|---|---|---|
| FR | 2 729 799 | 7/1996 |
| JP | 62-276470 | 12/1987 |
| JP | 2-141897 | 5/1990 |
| JP | 8-54924 | 2/1996 |
| JP | 11-24744 | 1/1999 |

OTHER PUBLICATIONS

Naoki Ura et al.: "Remote Maintenance Function for Distributed Control System" Advances in Instrumentation and Control, Instrument Society of America, Research Triangle Park, US, vol. 48, No. Part 3, 1993, pp. 1557-1564, XP000428426 ISSN: 1054-0032 *the whole document*.

Kunz J C et al: "Support for Integrated Value-Based Maintenance Planning" IEEE Expert, IEEE Inc. New York, US. vol. 11, No. 4, Aug. 1, 1996, pp. 35-44, XP000627015 ISSN: 0885-9000 *the whole document*.

* cited by examiner

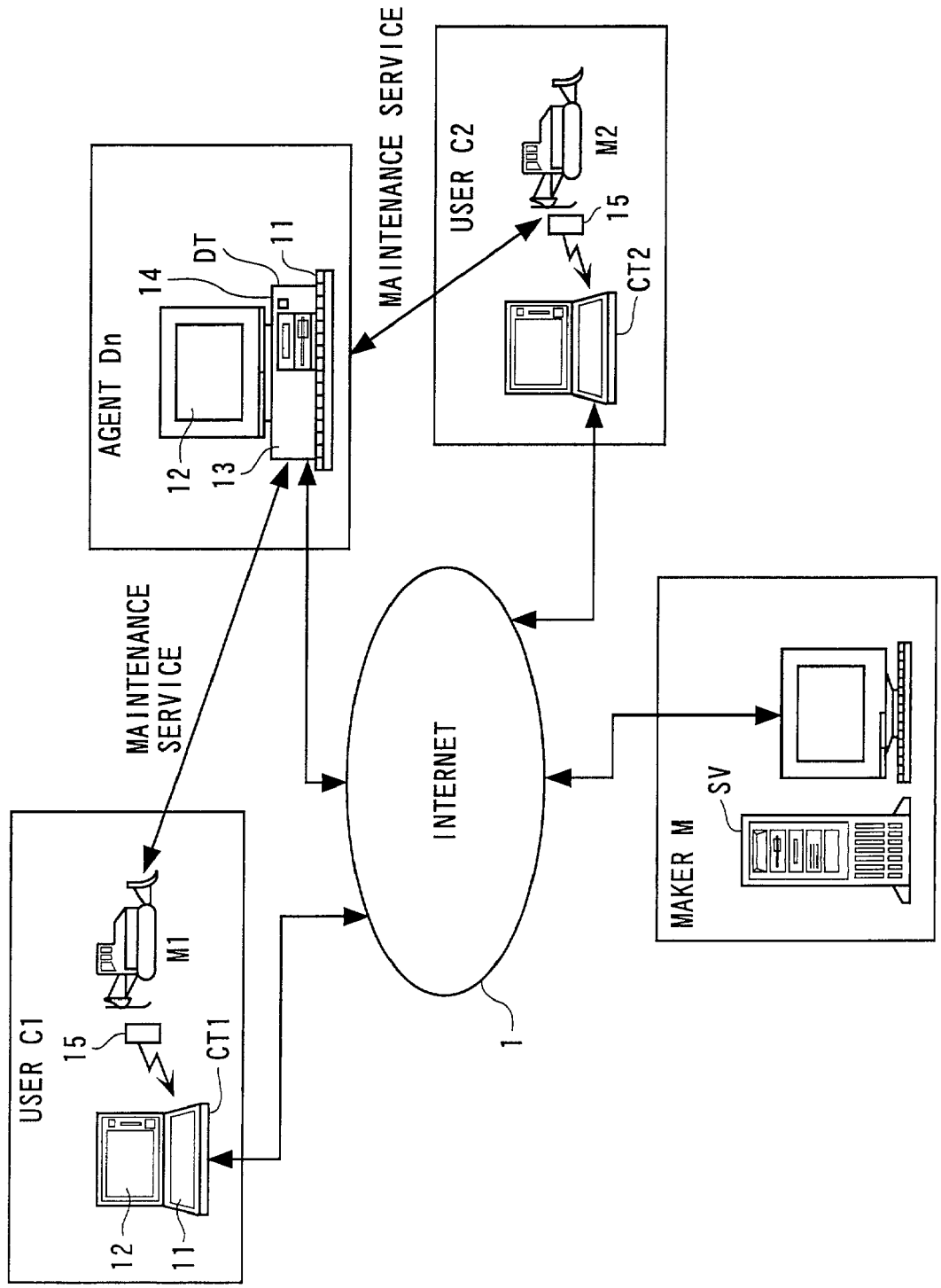
F I G. 1

FIG. 4

OPERATION ENVIRONMENT CONDITION DB

MODEL A  (INCLINED FIELD)

MODEL A  (HIGH-LAND AREA)

MODEL A  (SANDY AREA)

MAINTENANCE MANAGEMENT ITEMS

| MAINTENANCE MANAGEMENT ITEM | | EVERY H1 | EVERY H2 | EVERY H3 | EVERY H4 |
|---|---|---|---|---|---|
| PARTS OF MAIN BODY | | | | | |
| | | | | | |
| | | | | | |
| LUBRICATING OIL | ENGINE OIL | | ○ | | |
| | TRANSMISSION OIL | | | ○ | |
| | WORKING MACHINE OIL | | | ○ | |
| UNDER THE BODY | CLEANING OF AIR CLEANER | ○ | | | |
| | REPLACEMENT OF FILTER | | | ○ | |
| | CHECK | ○ | | | |
| ENGINE | VALVE CLEARANCE | | | ○ | |
| | FUEL INJECTION NOZZLE | | | ○ | |
| | | | | | |

USAGE CONDITION DB

MODEL A (CONDITIONS 3)

MODEL A (CONDITIONS 2)

MODEL A (CONDITIONS 1)
LOW-QUALITY LUBRICATING OIL
LOW-QUALITY FUEL

MAINTENANCE MANAGEMENT ITEMS

| MAINTENANCE MANAGEMENT ITEM | | EVERY H1 | EVERY H2 | EVERY H3 | EVERY H4 |
|---|---|---|---|---|---|
| PARTS OF MAIN BODY | | | | | |
| | | | | | |
| | | | | | |
| LUBRI-CATING OIL | ENGINE OIL | | ○ | | |
| | TRANSMISSION OIL | | | ○ | |
| | WORKING MACHINE OIL | | | ○ | |
| | CLEANING OF AIR CLEANER | ○ | | | |
| | REPLACEMENT OF FILTER | | | ○ | |
| UNDER THE BODY | CHECK | ○ | | | |
| ENGINE | VALVE CLEARANCE | | | ○ | |
| | FUEL INJECTION NOZZLE | | | ○ | |

INDIVIDUAL NUMBER-SPECIFIC MAINTENANCE MANAGEMENT DATA TABLE

| INDIVIDUAL NUMBER | MODEL | CONTRACT RANK | START DATA OF THE MAINTENANCE CONTRACT | OPERATION TIME UNDER MAINTENANCE CONTRACT | OPERATION TIME | MAINTENANCE WORK HISTORY | MAINTENANCE ACTUAL RESULT VALUE [J] | USAGE CONDITIONS | OPERATING CONDITIONS |
|---|---|---|---|---|---|---|---|---|---|
| 0001 | A | R1 | 99/3/13 | 30000 | | | 32,000 | | |
| 0002 | A | R1 | 00/1/11 | 20000 | | | 5,000 | | |
| 0003 | A | R3 | | | | | | | |
| 0004 | A | R2 | | | | | | | |
| 0001 | B | R1 | | | | | | | |
| 0002 | B | | | | | | | | |
| 0001 | C | | | | | | | | |

PRICE INFORMATION DB

| COUNTRY | JAPAN | AGENT | X | CLIENT | A |
|---|---|---|---|---|---|
| PART NUMBER | PRICE | | WORK CODE | PRICE | |
| AAA-BBB | ¥XX,XXX- | | PPP-QQQ | ¥Y,YYY- | |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |

MODEL-SPECIFIC MAINTENANCE RANK TABLE

| CONTRACT RANK / MODEL | R 1 | R 2 | R 3 | R 4 |
|---|---|---|---|---|
| A | 50,000 | 50,000 | 50,000 | 100,000 |
| B | 35,000 | 50,000 | 65,000 | 80,000 |
| C | | | | |
| D | | | | |
| X | | | | |
| Y | | | | |
| Z | | | | |

29D

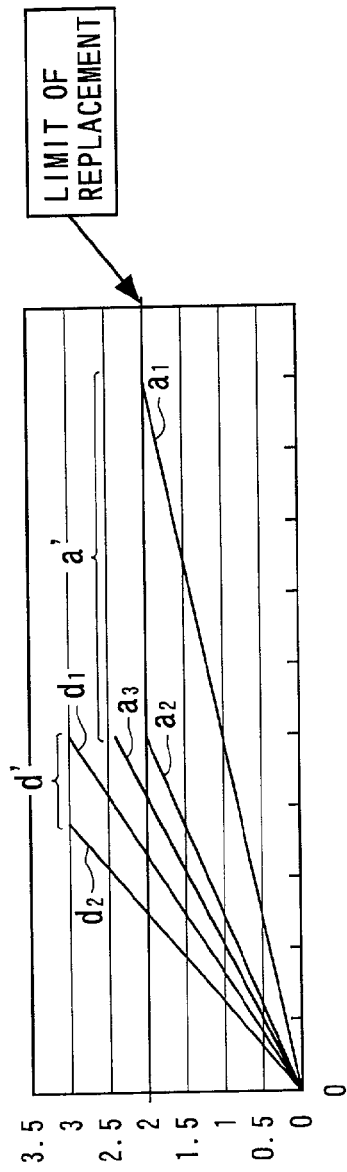

FIG. 11(A)

REPLACEMENT RATE FOR EACH PART    VARIATIONS DEPEND ON THE OPERATING
                                  CONDITIONS AND THE USAGE CONDITIONS.

HORIZONTAL AXIS: OPERATION TIME,
VERTICAL AXIS: CHARACTERISTIC VALUE FOR EACH PART

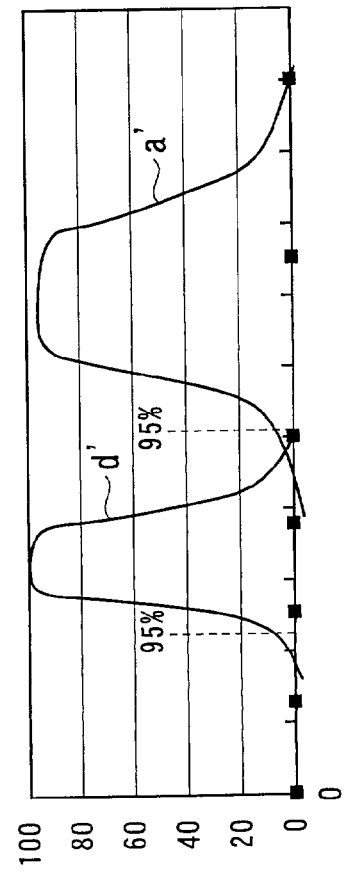

FIG. 11(B)

REPLACEMENT RATE FOR EACH PART    VARIATIONS DEPEND ON THE OPERATING
                                  CONDITIONS AND THE USAGE CONDITIONS.

HORIZONTAL AXIS: OPERATION TIME,
VERTICAL AXIS: REPLACEMENT PROVABILITY

FIG. 12

CONSTRUCTION MACHINE DATA

MODEL, DATA

| CUSTOM COUNTRY DB | A B C |
| --- | --- |
| MODEL SPECIFICATIONS | X Y Z |
| INDIVIDUAL NUMBER | #12345 |
| PRESENT | 2000/3/20 |
| OPERATION TIME | 9,040 |

CONTENTS OF THE NEXT RECOMMENDATION
REPLACEMENTS OF OIL AND FILTER

| OPERATION TIME | 9,250 |
| --- | --- |
| MAINTENANCE TIME | 2000/3/30 |
| REMARKS | RECOMMENDING THE REPLACEMENTS OF OIL AND FILTER. |
| COST | |
| OPTION 1 | $200 |
| OPTION 2 | $350 |

PUBLIC, CUSTOM MENU

JUMP TO:
○ SERVICE MANAGER HEAVY MACHINERY MANAGEMENT
○ RECOMMENDATION
○ MAINTENANCE CONTRACT
○ REPAIR HISTORY ACCUMULATED REPAIR COST
○ PART BOOK REFERENCE CHART OF RECOMMENDED PARTS

MEASUREMENT INFORMATION

| MACHINE SURVEILLANCE INFORMATION | 2000/3/20 O.K. Go |
| --- | --- |
| MEDICAL CHECKUP | 2000/3/20 O.K. Go |
| OIL ANALYSIS | 2000/3/20 CAUTIONS |
| UNDER-BODY MEASUREMENT | ----- |

OPERATING CONDITIONS

SANDY AREA
HIGH-LAND AREA
INCLINED FIELD

USAGE CONDITIONS

| USAGE FUEL | LIGHT-OIL |
| --- | --- |
| LIGHT-OIL SULFUR PART | 0.50% |
| LUBRICATING OIL | CD-SAE 15W-40 |
| EARTH AND SAND | Si |

FIG. 13

RECOMMENDATION

2    CUSTOM MENU

MODEL, DATA

| CUSTOM COUNTRY DB | A B C |
| --- | --- |
| MODEL SPECIFICATIONS | X Y Z |
| INDIVIDUAL NUMBER | #12345 |
| PRESENT OPERATION TIME | 2000/3/20  9,040 |

JUMP TO:
- ○ SERVICE MANAGER HEAVY MACHINERY MANAGEMENT
- ○ RECOMMENDATION
- ○ MAINTENANCE CONTRACT
- ○ REPAIR HISTORY ACCUMULATED REPAIR COST
- ◉ PART BOOK REFERENCE CHART OF RECOMMENDED PARTS

MENU OF RECOMMENDATION

OPTION 1
REPLACEMENTS OF OIL AND FILTER

| OPERATION TIME MAINTENANCE TIME AFTER THE NEXT | 9,500 2000/4/12 |
| --- | --- |
| ESTIMATION | 200 $ |
| COST PER HOUR | 0.95 $/h |

OPTION 2
REPLACEMENTS OF OIL AND FILTER (SOPHISTICATED PARTS)

| OPERATION TIME MAINTENANCE TIME AFTER THE NEXT | 9,750 2000/4/22 |
| --- | --- |
| ESTIMATION | 350 $ |
| COST PER HOUR | 0.76 $/h |

OPERATING CONDITIONS
- SANDY AREA
- HIGH-LAND AREA
- INCLINED FIELD

USAGE CONDITIONS

| USAGE FUEL | LIGHT-OIL |
| --- | --- |
| LIGHT-OIL SULFUR PART | 0.50% |
| LUBRICATING OIL | CD-SAE 15W-40 |
| EARTH AND SAND | Si |

MEASUREMENT INFORMATION

| MACHINE SURVEILLANCE INFORMATION | 2000/3/20 O.K. Go |
| --- | --- |
| MEDICAL CHECKUP | 2000/3/20 O.K. Go |
| OIL ANALYSIS | 2000/3/20 CAUTIONS |
| UNDER-BODY MEASUREMENT | ——— |

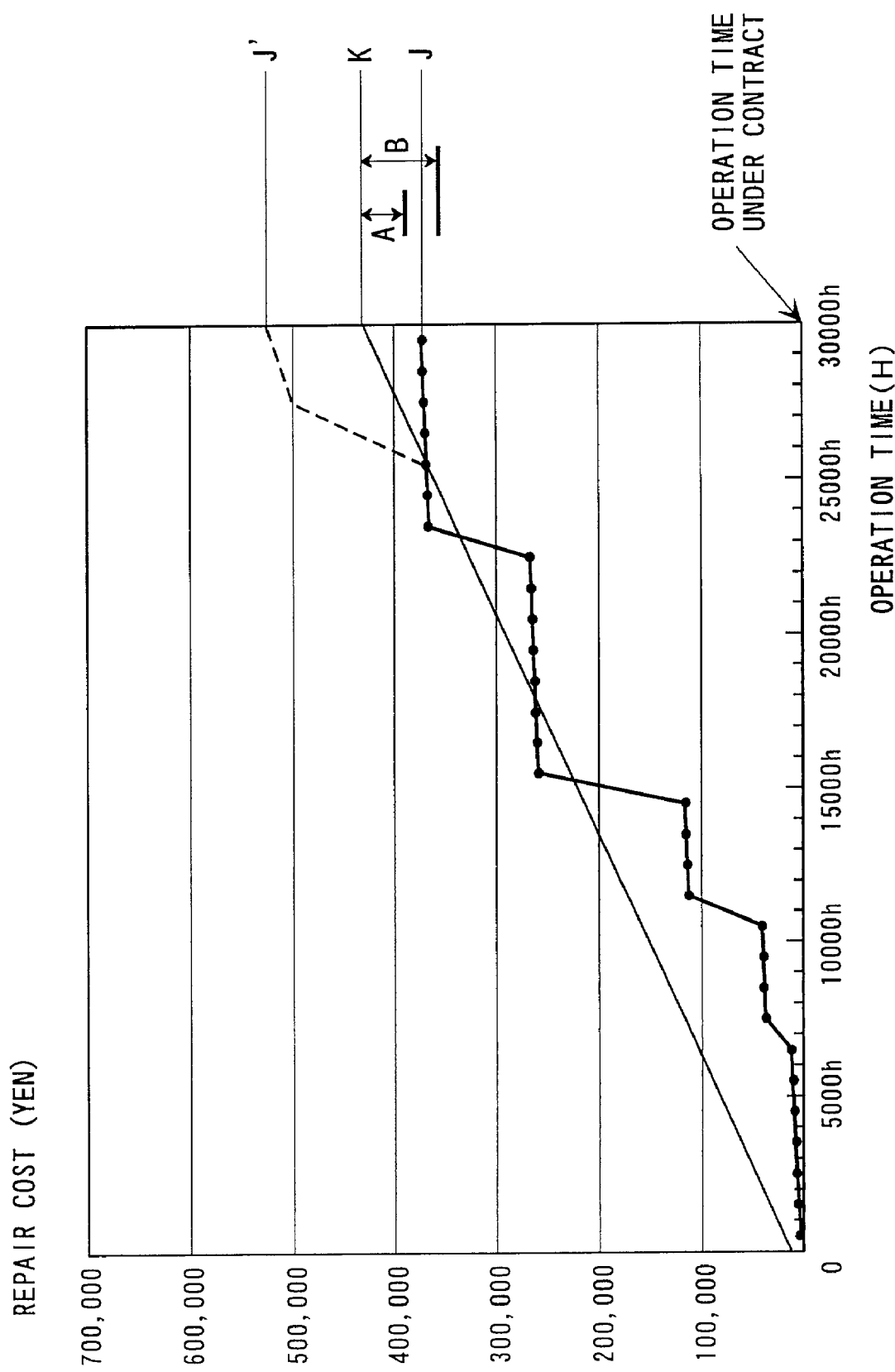

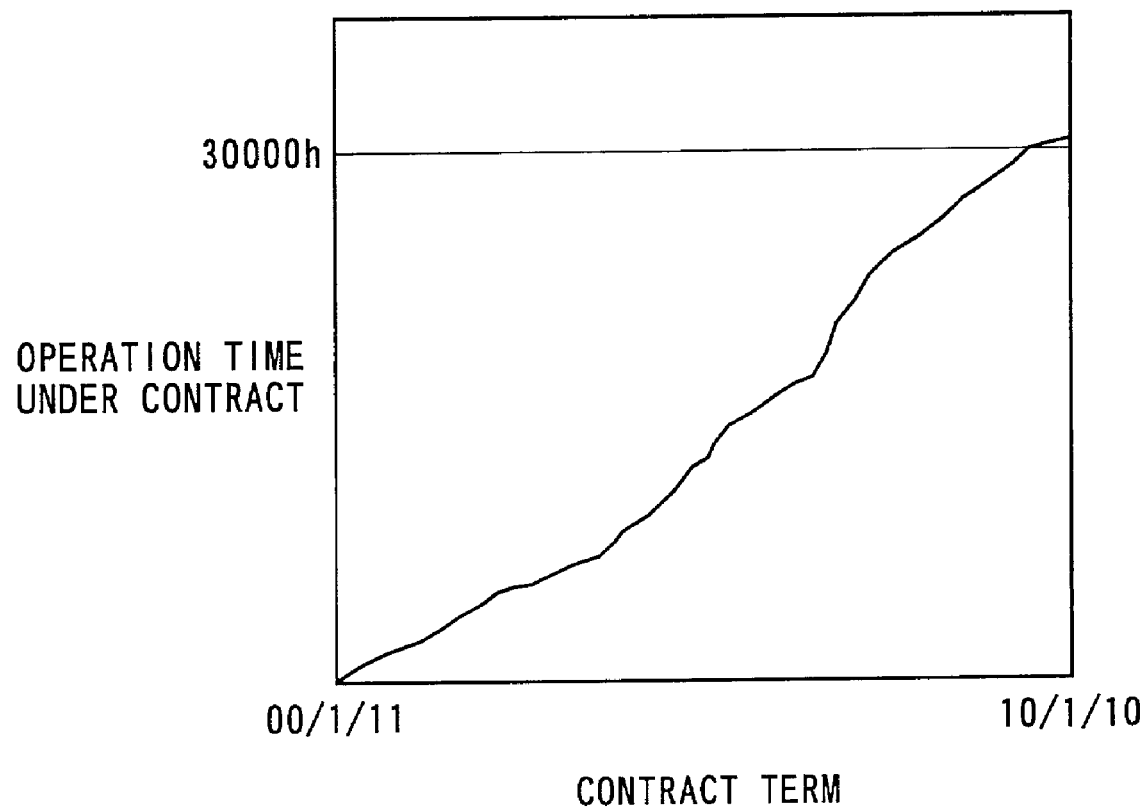
F I G. 17

SYSTEM, METHOD, COMPUTER PROGRAM, AND RECORDING MEDIUM FOR MACHINE-MANAGEMENT

BACKGROUND OF THE INVENTION

1. Field of the Invention

The present invention relates to a management system, a management method, a computer program, and a recording medium to be used for the management of a machine equipped with a driving-power source. More specifically, the present invention relates to a management system, a management method, a computer program, and a recording medium for easily performing the management of each of machines that include mobile- and fixed-model working machines and electric power generators for construction, civil engineering works, and so on, where the management may be of maintenance or overhaul, or maintenance contract to a machine.

2. Description of the Related Art

Regarding the management of each of machines that include mobile- and fixed-model working machines and electric power generators for construction, civil engineering works, and so on, there is provided an operation manual (instruction manual) or the like that sets up and clearly describes the conditions for maintenance, for example, maintenance cycle, overhaul cycle, and part-replacement cycle, for helping that the user determines when the oil needs changing, parts need replacing, or the like.

Thus, the user who bought the machine may perform the maintenance procedure when the machine's operating time or the like meets one of the maintenance conditions described in the operation manual (instruction manual). If the user has to replace a part with new one, for example, he or she will send an order of request for part-replacement to a manufacturer, a sales agency, or the like.

In many cases, these machines are comparatively large-sized and are expensive. Therefore, a maintenance contract is usually made between a purchaser who purchased the machine and the machine's maker or store such that the maintenance is carried out in many cases by a maintenance section of the maker or store.

The person in charge of the maintenance section performs the predetermined procedures of check and maintenance periodically, or performs a part-replacement or a overhaul after the predetermined operation time elapsed. On the other hand, the user who receives the service pays the charge of maintenance contract in a lump sum or in installments.

However, the conventional machine-management method has the problems of the management itself as follows.

(1) The operation manual (instruction manual) specifies maintenance conditions for every model. However, the items (fixed maintenance etc.) to be performed and their target parts to be checked for every operation differ from each other. In addition, there are many check items and parts. Accordingly, leaving the management in user's hands becomes too burdensome for the user, so that the user might omit any item or part (component) from those required in the maintenance. It is noted that such maintenance may be very expensive.

(2) The maker recommends and specifies maintenance standards and maintenance articles, which correspond to each of imaginable cases in service. However, some of the standards cannot be the best for each machine. Depending on the usage conditions and operating conditions of the machine, the time for maintenance required will be shifted from the predetermined period.

(3) The section where the maintenance management is performed is difficult to work out the maintenance as planed. In this case, administrative expenses for performing planned maintenance are needed.

(4) It is difficult to estimate the costs to be expensed throughout the lifetime of the machine.

Furthermore, the conventional management method has the problems in the management of maintenance contract.

(5) The administrative cost described above varies depending on the usage conditions or operating conditions of the machine, so that it is difficult to estimate that cost.

(6) A predicted cost at the time of conducting the maintenance contract may be less than the actual const of the maintenance or may be sharply exceeded from it. Therefore, much effort and much time have been expended on attempting to lessen the difference of such prediction and actual result, sufficient time and many labors were needed for negotiation of a maintenance contract.

Accordingly, one of the objects of the present invention is to provide a management system, a management method, a computer program, and a recording medium, which easily provide information about suitable maintenance management in consideration of usage conditions and operating conditions without burdening the user or the agent with these conditions.

Another object of the present invention is to provide a management system, a management method, a computer program, and a recording medium, by which the above disadvantages can be resolved, and the burden of the both sides that make a maintenance contract can be properly adjusted, and the maintenance contract can be easily fulfilled.

SUMMARY OF THE INVENTION

Management System by which Machine Manages Itself

According to the present invention, a management system by which a machine manages itself adopts the following structure.

In the first aspect of the present invention, a management system of a machine equipped with a driving power source, comprises:

a maintenance management information storage means that stores information about conditions of maintenance on the basis of both usage conditions and operating conditions for each model of the machine;

an input means for entering data of the machine's model, the usage conditions, and the operating conditions into the storage means;

a display means; and a control means, wherein on the condition that the machine's model, the usage conditions and the operating conditions of the machine have been entered in the storage means through the input means, the control means reads out conditions for maintenance that correspond to the machine's model, the usage conditions, and the operating conditions, respectively, from the storage means to predict information about a recommendation for maintenance management at a predetermined operation time of the machine with reference to the conditions of maintenance.

Here, the term "conditions of maintenance" denotes conditions or requirements for performing works according to a maintenance management, which include lubrication, inspection, adjustment, part-replacement, cleaning, and so on. The term "maintenance management recommendation information" denotes information about one of recommendations to perform, for example, a part-replacement, one of the above maintenance works, and a specific part-replacement for reducing the cost and so on.

According to such a management system of the machine, if the machine's model data, the usage conditions, and the operating conditions are entered through the input means, the control means read out conditions for maintenance, which correspond to the machine's model data, the usage conditions, and the operating conditions, from the maintenance management information storage means to predict information about a recommendation for maintenance management at a predetermined operation time of the machine with reference to the conditions of maintenance. For instance, the management system predicts when the oil needs changing or filter and other parts need replacing, or when the over haul needs performing, on the basis of maintenance conditions corresponding to model data, usage conditions, and operating conditions and information about an operation of the machine (e.g., time). Subsequently, information about a recommendation for maintenance management depending the prediction is represented on the display means.

Therefore, we can easily obtain information about a suitable recommendation for maintenance management in consideration with the usage conditions and operating conditions of each machine without burdening the user or the agent. The user or the agent may manage the machine more easily, compared with the conventional one. Moreover, the user of the agent may also draw up or adjust the management schedules for maintenance, over haul, and so on. Consequently, the number of steps in the process of machine management can be reduced, and the whole life cost of the machine can be predicted.

Regarding the first aspect of the invention, it is preferable that the machine-management system of the present invention may comprise a state-measuring means to measure the state of the machine and produce information about the results of measurement, so that the control means may optimize the information about a recommendation for maintenance management with reference to the information about the results of measurement from the state-measuring means.

According to the machine-management system, the reliability of maintenance management recommendation information can be raised because the maintenance management recommendation information is optimized with reference to the measurement information of the machine generated from the state-measuring means, i.e., the state of the present condition of the machine.

In the machine-management system of the present invention, the control means may include a different part determination means that estimates the unusual part of the machine on the basis of the information about the results of the above measurement provided from the state-measuring means; and determines whether there is a need of replacing the part with new one.

According to the machine-management system, the unusual part of the machine is estimated on the basis of the information about the results of measurement for the machine, which is produced from the state measurement. That is, the control means determines whether there is a need of replacing the part with new one with reference with the actual state of the machine, so that the parts can be previously replaced with new one even if something unusual occurs in any part of the machine at the time before the predicted period.

In the machine-management system of the present invention, the control means may include a means for reconsidering a part-replacing condition among the conditions for maintenance, which are stored in the storage means for storing the maintenance management information with reference to the predicted maintenance management recommendation information and the maintenance conditions stored in the maintenance management information storage means.

According to the machine-management system, the part-replacing condition stored in the maintenance management information storage means with reference to the predicted maintenance management recommendation information and the maintenance conditions stored in the maintenance management information storage means. Therefore, more suitable part-replacement information can be provided even if the time of actually requiring the replacement is shifted from the part-replacement condition determined at the time of design or manufacturing process of the machine.

In the second aspect of the present invention, the machine-management system is a management system for a machine equipped with a driving power source. The system comprises a client terminal and a server connected to the client terminal through a network. In this system, furthermore, the client terminal comprises: an input means for entering data of the machine's model, usage conditions, and operating conditions; a display means; a control means for transmitting the data of the machine's model, usage conditions, and operating conditions to the server through the network and representing the received information on a screen of the display means. Furthermore, the server comprises; a maintenance management information storage means that stores maintenance conditions depending on the usage conditions and the operating conditions for each model of the machine; and a control means that reads out the data of machine's model, the usage conditions, and the operating conditions transmitted from the client terminal, predicts information that recommends a maintenance management at a predetermined operation time with reference to the maintenance information, and represents the predicted information that recommends a maintenance management on the display means.

According to the management system of the machine, if the machine's model data, usage conditions, and operating conditions are entered in the client terminal. Then, these conditions are transmitted to the server. The server reads the data about maintenance conditions corresponding to the machine's model data, usage conditions from the maintenance management information storage means. Subsequently, the server predicts maintenance management recommendation information for a certain operation time of the machine on the basis of the maintenance conditions, and then represents the predicted information that recommends a maintenance management on the display means.

In this management system, the same effects are expectable just as in the case with claim 1. In addition, each machine is unitary manageable in the server, allowing the maintenance management completely without any burden (with the equipment or work) on the user who owns the machine and the agency that takes charge of the maintenance user. Consequently, the costs for maintenance management can be also reduced more.

In the machine-management system of the present invention, the server may distribute the predicted maintenance management recommendation information to the client terminal connected to the server through the network.

According to this machine-management system, the predicted maintenance management recommendation information is distributed to the client terminal, so that the user can be urged to perform the required maintenance management while the client can be directed to prepare the required work and supply the required parts.

In machine-management system of the present invention, if the server executes the predicted maintenance management recommendation information under some conditions, the server may include a means for representing the contents of cost estimation on the display means with respect to each of these conditions.

According to this machine-management system, as the server includes a means for representing the contents of cost estimation on the display means, the cost estimation may be performed with respect to the required cost under each condition when the predicted maintenance management recommendation information is realized under several conditions. Therefore, the executable condition can be selected with confirming the contents of cost estimation.

[Management System for Managing Maintenance Contract of Machine]

This invention adopts the following construction as a management system that manages the maintenance contract of a machine.

The machine-management system of the present invention comprises:

a maintenance rank table organized by model (model-specific table that lists maintenance ranks) that stores a maintenance predicted value with respect to maintenance within a contract term or a contract time for two or more contract ranks every each model;

an input means that enters a model of machine that makes a maintenance contract, a contract rank, and a maintenance actual result value;

a means for storing a maintenance actual result value, where the maintenance actual result value of the machine, which is entered using the input means and accumulatively stored; and a determination means that determines whether a maintenance actual result value is larger than a maintenance predicted value, where the maintenance predicted value that corresponds to the machine's mode and the contract rank is read out of the maintenance rank table organized by model after a expiration of the contract of the machine, while the maintenance result value of the machine is read out of the storage means that stores the maintenance actual result value.

Here, the term "maintenance predicted value" means the expense predicted to be required about maintenance in the maintenance contract time (for example, operation time under contract) or contract term, or the point that expresses the expense as mark. In addition, the term "maintenance actual result value" means the point which expresses those work and costs as mark, when the amount of cost which is actually expensed in the maintenance time or contract term, or the point which expresses the work or expense as mark.

According to this machine-management system, after the expiration of the maintenance contract of the machine, a maintenance predicted value that corresponds to the machine's mode and the contract rank is read out of the maintenance rank table organized by model, while a maintenance actual result value is read out of the means for storing the maintenance actual result value. Subsequently, the determination means determines whether the maintenance actual result value is larger than the maintenance predicted value.

As a result, if the maintenance actual result value is significantly lower than the maintenance predicted value, it is considered that the maintenance-receiving side pays too much. Thus, any profit may be returned to the maintenance-receiving side by means of dividend payment, extension of maintenance contract time period or maintenance contract term, a cut at the time of a following maintenance contract, or the like. On the other hand, if the maintenance actual result value substantially exceeds the maintenance predicted value, it is loss of the maintenance-providing side. Thus, any profit may be returned to the maintenance-providing side by the re-examination of contract rank, the increase of payment, or the like at the time of making a following maintenance contract. Consequently, the burden of the both sides that make a maintenance contract can be properly adjusted. Furthermore, the system contrasts the maintenance predicted value and the maintenance actual result value based on the costs that the actual maintenance took. Therefore, any negotiation at the time of a future maintenance contract can also be performed easily.

In the machine-management system of the present invention, it is preferable that the determination means includes a means to calculate a dividend, where a dividend is calculated if under the condition that the maintenance actual value is lower than the maintenance predicted value and the difference between these values is higher than the predetermined value.

According to the machine-management system, the calculation of dividend is allowed under the condition that the maintenance actual value is lower than the maintenance predicted value and the difference between these values is higher than the predetermined value. Therefore, any profit can be returned to the pay side, so that the problem of excess in payment on the maintenance-receiving side can be solved.

In the machine-management system of the present invention, preferably, the contract rank of maintenance rank table organized by model may be defined on the basis of the usage conditions and the operating conditions of the machine.

According to this machine-management system, the contract rank is defined on the basis of the usage conditions and the operating conditions of the machine. Therefore, the contents of a contract are changeable depending on the use place, for example, according to whether the machine is used in the desert area, the high-ground area, or the like, or it works in the cold area or the tropical area. A proper maintenance contract can be made in consideration of these conditions.

In the third aspect of the present invention, The machine-management system comprises: a client terminal and a server that connects to the client terminal through a network, wherein the client server has an input means for entering a model of machine under a maintenance contract, a contract rank, a maintenance actual result value, a display means, and a control means that requests data to the server and represents the data transmitted from the server on the display means. The server comprises a maintenance rank table organized by model that stores a maintenance predicted value with respect to a maintenance of each machine's mode within a contract time or a contract term every two or more contract ranks, a means of storing a maintenance actual result value, which accumulatively stores the maintenance actual result value of the machine entered from the client terminal, and a determination means that reads out the maintenance predicted value, which corresponds to the machine's model and the contract rank, from the maintenance actual result value storage means, while reads out the maintenance actual result value of the machine from the maintenance actual result value storage means, and then determines whether the maintenance actual result value is larger than the maintenance predicted value.

According to the machine-management system, at the time of making a maintenance contract, on the client terminal's side, the maintenance rank table organized by model is downloaded from the server and represented on the display means, so that the information about model and the contract rank of the machine to be subjected to the maintenance contract can be entered while checking the maintenance rank table organized by model. Furthermore, a maintenance actual value is entered every time the maintenance is performed, so that such a value is sent to the server through the network.

In the server, the maintenance actual result value is accumulatively stored in the maintenance actual result value storage means. After the expiration of the maintenance contract, a maintenance predicted value that corresponds to the model and the contract model of the machine is read out of the maintenance rank table organized by model, while a maintenance actual result value of the machine is read out of the maintenance actual result value recording means. Then, the determination means determines whether the maintenance actual result value is larger than the maintenance predicted value.

Therefore, this management system has the same effects as those of one described in claim 8 and also other effects, for example, of allowing a maintenance contract which can be easily implemented as the contents of maintenance contract and the maintenance actual result value are easily entered while checking the contents of the maintenance contract using the client terminal by a business person transferred from the agent to the purchaser of the present machine. Furthermore, there is no need to have a maintenance rank table organized by model, a means that stores the maintenance actual result value, a determination means, and so on. Therefore, the present system is allowed to use a cheep and typical terminal.

(Machine-management System)

In the present invention, the management of machine itself and the management of maintenance contact, which are described above, can be implemented by the he following management method.

In the fourth aspect of the present invention, the machine-management method is that of managing a machine equipped with a driving-power source and comprises the steps of: storing maintenance conditions for each mode of the machine, which depend on usage conditions and operating conditions into a means for storing maintenance management information; entering data of machine's mode, the usage conditions, and the operating conditions, reading out the maintenance conditions that correspond to the input data of machine's model, the usage conditions, and the operating conditions from the means for storing maintenance management information, predicting maintenance management recommendation information at a certain operation time of the machine with reference to the maintenance conditions read out, and displaying the maintenance management recommendation information on the display means.

According to the machine-management method, the same effects as those of the management of the machine itself in the machine-management system described above.

In the fifth aspect of the present invention, the method of machine management method comprises the steps of: storing a maintenance predicted value with respect to a maintenance in a maintenance rank table organized by model in a contract time period or in a contract term every two or more contract ranks; storing the mode of a machine under maintenance contract, contract rank, and maintenance actual result value; accumulatively storing a maintenance actual result value of the machine being entered into the means for storing the maintenance actual result; reading the maintenance actual result value out of the means for storing the maintenance actual result value in addition to read a maintenance predicted value out of the machine maintenance rank table organized by mode, where the maintenance predicted value correspond to the machine's mode and the contract rank; and determining whether the maintenance actual result value is larger than the maintenance predicted value.

According to this machine-management method, the same effects as those of the management of maintenance contract of the machine in the above machine-management system.

In the machine-management method in accordance with the present invention, if the maintenance value is smaller than the maintenance predicted value, it is preferable to calculate and pay the dividend under the conditions that the difference between these values is larger than a predetermined value.

According to the machine-management method, the problem of excess in payment on the maintenance-receiving side can be solved, as described in the management system.

In the machine-management method of the present invention, it is preferable to re-examine the contract rank of the maintenance rank table organized by model under the conditions that difference between these values is larger than a predetermined value and enter the reexamined contract rank in a following contract.

According to the management method of this machine, if the difference of maintenance predicted value and maintenance actual result value exceeds a predetermined value, i.e., the maintenance actual result value is much smaller than the maintenance predicted value or the maintenance actual result value extensively exceeds the maintenance predicted value, the contract rank in the maintenance rank table organized by model can be reexamined, so that re-examined contract rank is entered at the time of a following contract. Therefore, an appropriate contract can be conducted at the time of a future maintenance contract.

In the management method of the machine this invention, in case the contract rank in maintenance rank table organized by model is examined again, it is desirable to re-examine with reference to usage conditions and operating conditions of the machine.

According to the management method of this machine, contract rank in maintenance rank table organized by model is re-examined again with reference to usage conditions and operating conditions of the machine. Therefore, the proper maintenance contract, which suited the situation of each machine, can be made.

(Computer Program and Memory Medium)

The computer program of this invention allows a computer to perform the management method of a machine.

The recording medium of this invention stores the computer program for allowing a computer to perform the management method of a machine.

Performing this computer program by means of computer, the machine-management method is realized and the same effects as those of the management can attain system.

BRIEF DESCRIPTION OF THE DRAWINGS

FIG. 1 is a schematic diagram that illustrates the whole system of machine management in accordance with the first preferred embodiment of the present invention;

FIG. 4 is a schematic diagram that illustrates an operational surrounding condition data base (DB) stored in the server provided in the system of machine management in accordance with the first preferred embodiment of the present invention;

FIG. 5 is a schematic diagram that illustrates a usage condition data base (DB) stored in the server provided in the system of machine management in accordance with the first preferred embodiment of the present invention;

FIG. 7 is a schematic diagram that illustrates a model-specific maintenance management data table stored in the server provided in the system of machine management in accordance with the first preferred embodiment of the present invention;

FIG. 8 is a price information data base (DB) stored in the server provided in the system of machine management in accordance with the first preferred embodiment of the present invention;

FIG. 9 is a schematic diagram that illustrates a model-specific maintenance rank table stored in the server provided in the system of machine management in accordance with the first preferred embodiment of the present invention;

FIG. 11A is a graph that illustrates the principle of determination, applied on a part-specific determination means of the server provided in the system of machine management in accordance with the first preferred embodiment of the present invention, where a horizontal axis represents the operation time and a vertical axis represents the characteristic value of each part;

FIG. 11B is a graphic diagram that illustrates the principle of determination, applied on a part-specific determination means of the server provided in the system of machine management in accordance with the first preferred embodiment of the present invention, where a horizontal axis represents the operation time and a vertical axis represents the percentage of replacement;

FIG. 12 is a schematic diagram that illustrates a display screen of the server provided in the system of machine management in accordance with the first preferred embodiment of the present invention;

FIG. 13 is a schematic diagram that illustrates another display screen of the server provided in the system of machine management in accordance with the first preferred embodiment of the present invention;

FIG. 14 is a graphic diagram that illustrates the relationship between the maintenance predicted value and the maintenance actual result value in the system of machine management in accordance with the first preferred embodiment of the present invention;

FIG. 17 is a graphic diagram that illustrates the relationship between the contract term and the contract operation time.

DETAILED DESCRIPTION OF PREFERRED EMBODIMENT(S)

Figure 2:
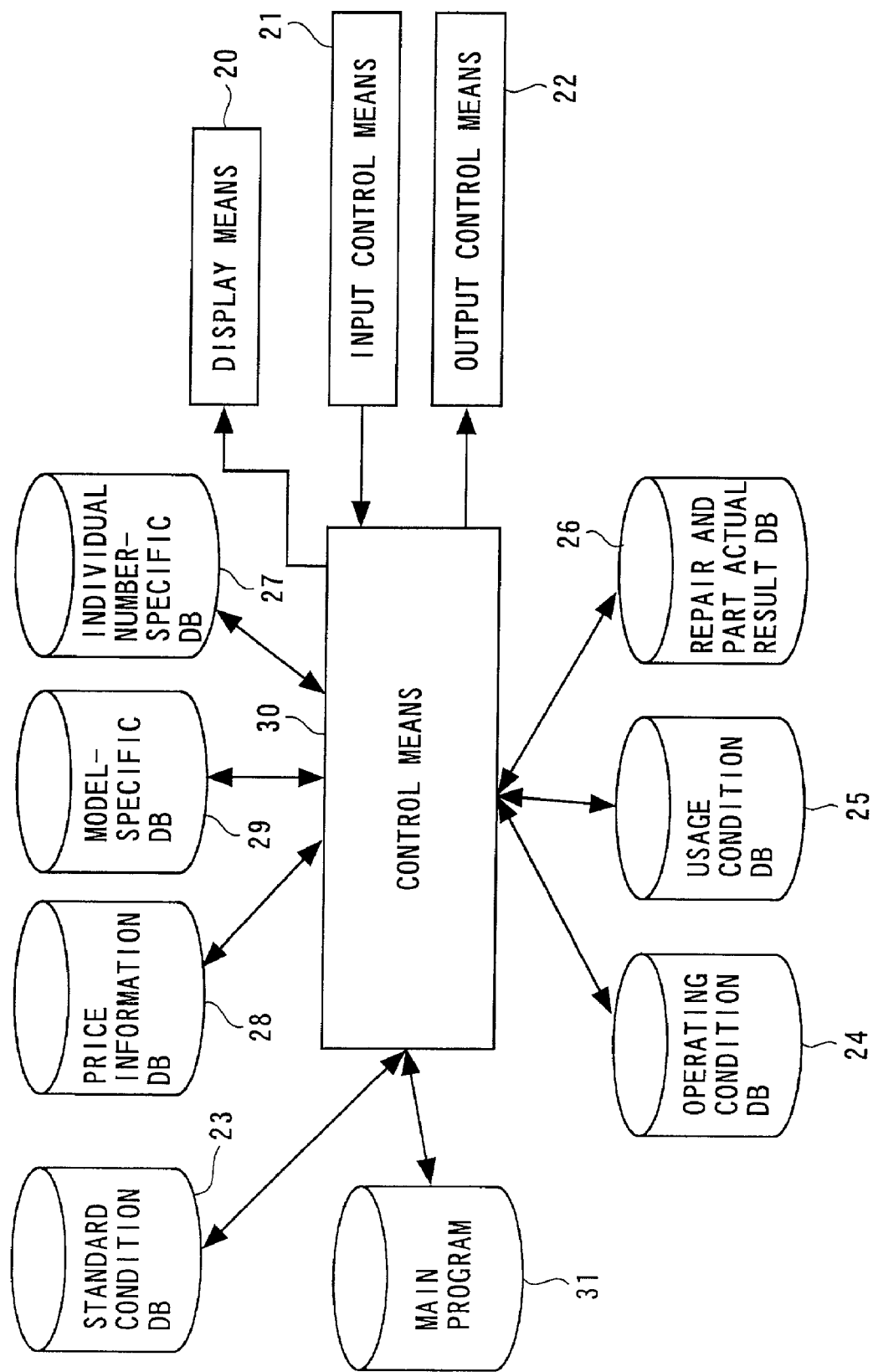
FIG. 2 is a block diagram that illustrates a server provided in the system of machine management in accordance with the first preferred embodiment of the present invention.

Hereinafter we will describe preferred embodiments of the present invention with reference to the attached drawings.

[Systems Overview]

FIG. 1 illustrates a system of maintenance management in accordance with a first preferred embodiment of the present invention. In this management system, a maker has information about recommendable maintenance management for each of machines (e.g., construction machines) equipped with driving-power means M1, M2, which belong to the respective users C1, C2. In the following description, by the way, "the information about recommendable maintenance management for each of machines" is simply referred to as "the recommendable management information", which is recommendable to the corresponding machine. The recommendable management information can be distributed to each user C1, C2 in addition to a dealership (e.g., an authorized sales agency) Dn. The agent Dn performs maintenance each of the machines M1, M2 of the respective users C1, C2, including services such as check or general inspection, repair, and replacement if required. In this embodiment, the system also has a management function by which the managements of the maintenance contracts of the respective machines M1, M2 of each user C1, C2, M2 are centered and organized in the manufacturer M.

The management system comprises a computer network such as Internet 1; client terminals CT1, CT2 connected to the computer network 1 and placed on the users C1, C2, respectively; a agent client terminal DT connected to the computer network 1 and placed on the agent Dn; and a server SV placed on the maker M and communicates with the user client terminals CT1, CT2 and the agent client terminal DT through the computer network 1.

[Client Terminals]

Each of the user client terminals CT1, CT2 comprises an input means 11 such as a key board for entering the information about the machine M1, M2 into the terminal CT1, CT2 (i.e., such information includes a model data, usage conditions, operating conditions, and so on with respect to the machine M1, M2); a display means 12 such as a liquid crystal display screen or CRT; a storage means such as a hard disk (not shown); and a control means such as CPU (not shown).

Each of the machines M1, M2 is additionally equipped with a state-measuring means 15 that measures the state of each part or component of the machine M1, M2. The measuring results can be transmitted as measurement information from the state-measuring means 15 to the server SV through the corresponding user client terminal CT1, CT2 and the computer network 1.

The agent client terminal D1 comprises an input means 11 such as a key board for entering the information about the machines M1, M2 and the contents of maintenance contracts (i.e., individual numbers and models of machines M1, M2, contract ranks, initial date of each maintenance contract, operation times under contract, operation times, maintenance actual result values, usage conditions, operating conditions, and so on); a display means 12 such as a liquid crystal display screen or CRT; a storage means 13 such as a hard disk; and a control means 14 such as CPU. These input means 11, display means 12, storage means 13, and control means 14 may be the same as those of the client terminals CT1, CT2.

In each of the client and agent terminals, the control means 14 has functions to transmit various input data from the input means 11, such as model data, usage conditions, and operating conditions of the respective machines M1, M2, to the server SV through the computer network 1 and displays replied information from the server SV on the display means 12.

[Server]

Referring now to FIG. 2, an example of the server SV will be described in more detail. As shown in FIG. 2, the server SV comprises a display means 20, an input control means 21, an output control means 22, and storage means 23–29 that stores various data bases, a storage means 31 that stores a main program, and a control means 30.

The storage means 23 stores a standard condition data base (standard condition DB), the storage means 24 stores an operation environment condition data base (operation environment condition DB), the storage means 25 stores a usage condition data base (usage condition DB), the storage means 26 stores a track record data base (track record DB) of repair and part-usage, the storage means 27 stores an individual number specific data base (number-specific DB), the storage means 28 stores price information data base (price information DB), and the storage means 29 stores a model specific data base (model-specific DB).

A storage means for information about maintenance management is provided as an assembly consisting of the storage means 23 that stores the standard condition DB, the storage means 24 that stores the operation environment condition DB, and the storage means 25 that stores the usage condition DB. Thus, the maintenance management information storage means stores information about maintenance conditions for each machine depending on the usage conditions and the operating conditions.

[Configuration of Each Data Base]

Figure 3:
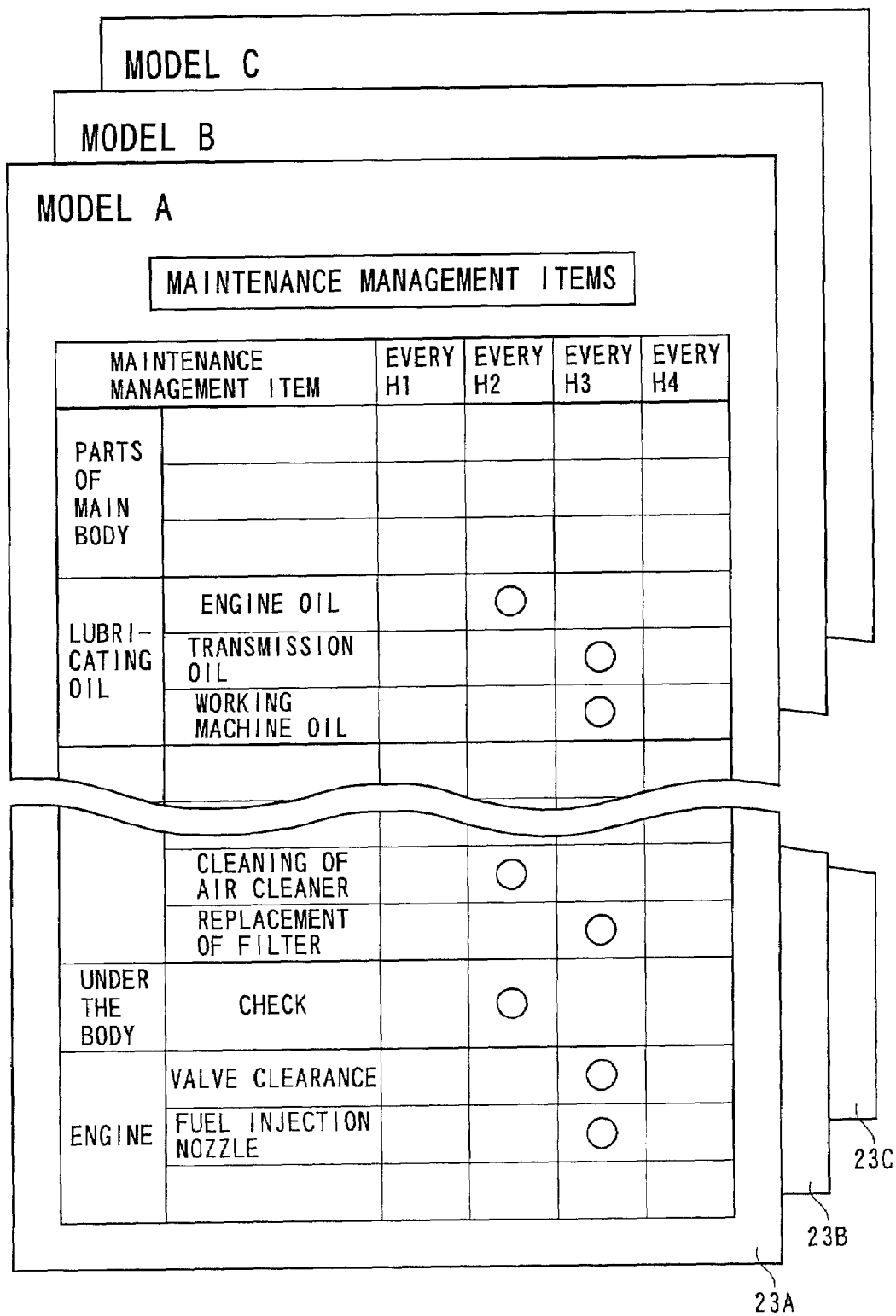
FIG. 3 is a schematic diagram that illustrates a standard data base (DB) stored in the server provided in the system of machine management in accordance with the first preferred embodiment of the present invention.
Figure 6:
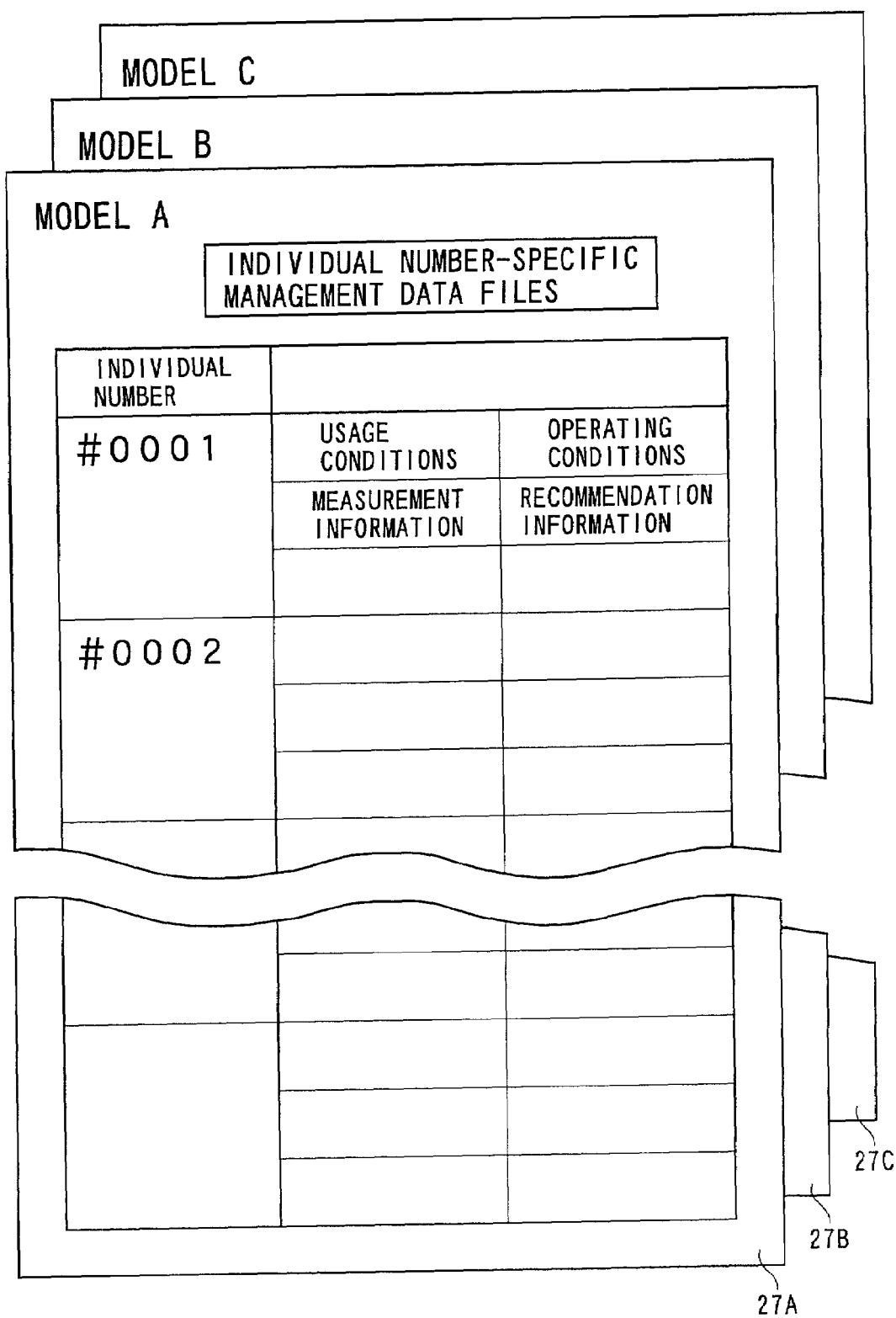
FIG. 6 is a schematic diagram that illustrates a plurality of model-specific management data files in a data base (DB) organized by model, which is stored in the server provided in the system of machine management in accordance with the first preferred embodiment of the present invention.

As shown in FIG. 3, the standard condition DB comprises tables 23A, 23B, 23C that list maintenance management items, which are specific to models A, B, C, respectively. Concretely, each of the tables 23A, 23B, 24C describes predetermined maintenance management items (main body, lubricating oil, under body, engine, etc.) and the time of when check and maintenance should be carried out (e.g., check and repair at intervals, or at the times of H1, H2) in accordance with these items. Each table may be marked with the additional information of a product number.

The operation environment condition DB has a set of model-specific tables, each of which lists various maintenance management items and corresponds to the operation of a machine under a specific environmental condition (operation environment condition). For the model A, for example, there are different table 24A, 24B, and 24C that correspond to different environmental conditions (e.g., the installation locations in sandy, highland, and sloping areas) as shown in FIG. 4. Each of the tables 24A, 24B, 24C describes predetermined maintenance management items (main body, lubricating oil, under body, engine, etc.) and the time of when check and maintenance should be carried out (e.g., check and repair at intervals, or at the times of H1, H2) in accordance with these items. Each table may be marked with the additional information of a product number.

The usage condition DB has a set of model-specific tables, each of which lists various maintenance management items and corresponds to the operation of a machine under a specific usage condition. For the model A, for example, there are different table 25A, 25B, and 25C that correspond to different usage conditions 1 to 3 (e.g., under the condition 1, the machine is driven using low quality lubricating oil and low quality fuel) as shown in FIG. 5. Each of the tables 25A, 25B, 25C describes predetermined maintenance management items (main body, lubricating oil, under body, engine, etc.) and the time of when check and maintenance should be carried out (e.g., check and repair at intervals, or at the times of H1, H2) in accordance with these items. Each table may be marked with the additional information of a product number.

The track record DB stores model, contract rank, initial date of maintenance contract, operation time under contract, operation time, history of maintenance work, maintenance actual result value [J], use conditions, operating conditions, and so on for each individual machine number. Among these items, individual machine number, model, contract rank, initial date of maintenance contract, operation time under contract, usage conditions, and operation environment condition are entered at the time of making the maintenance contract. On the other hand, the operation time is periodically entered, and the maintenance actual value is entered every time of just after the completion of maintenance work. The maintenance actual value is stored as a sum of actual expenses to the maintenance within the operation time under the contract.

As shown in FIG. 8, the price information DB stores a data table 28 A with a list of prices, where a price of each of various parts is stored on a part number basis in addition to a price of each work on a work code basis.

As shown in FIG. 9, the model-specific DB comprises a table 29D that lists maintenance ranks depending on the respective models. As shown in the figure, the table 29D stores a maintenance predicted value with respect to the maintenance to be performed within the operation time under maintenance contract on the basis of each of plural contract ranks (R1 to R4) for each model (A to Z) of the machine. Here, the contract rank is divided into several ranks depending on the usage conditions and the operating conditions of the machine. The maintenance predicted value is stored as a sum of predicted expenses to be required to perform maintenance within the operation time under the maintenance contract.

[Functions of the Server SV]

The control means 30 of the server SV stores data transmitted from each of client terminals DT, CT1, CT2 on the predetermined storage means. Also, the control means 30 reads the maintenance conditions (the conditions which defined in the table of maintenance management items) that correspond to model data, usage conditions, and operating conditions of each of the machines M1, M2 from each of the client terminals CT1, CT2, DT. The control means 30 then predicts information about a recommendation of contract management at a predetermined operation time of the machine M1, M2 on the basis of the maintenance conditions, followed by representing the predicted information about the recommendation of contract management on the display means 20 while sending such information to each of client terminals CT1, CT2, DT through the computer network 1. The control means 30 further include the following function and means.

(A) The function that optimizes the maintenance management recommendation information in consideration of the measurement information from the state-measuring means 15.

(B) The part-specific determination means that estimates the unusual part of a machine on the basis of the measurement information from state-measuring means 15, and subsequently determines the necessity for the part-replacement depending the result of the estimation, followed by displaying the result of the determination on the display means 20.

(C) The part-replacement reconsideration means that reconsiders the part-replacement condition among maintenance conditions stored in the respective storage means 23 to 25 on the basis of the predicted information about maintenance management recommendation and the maintenance conditions stored in the storage means 23 to 25.

(D) The representation means that represents the contents of cost estimation to be required for each condition when the predicted information about the maintenance management recommendation is executed under the several conditions.

(E) The determination means that determines whether a maintenance actual result value is larger or smaller than maintenance predicted value. The maintenance predicted value that corresponds to the machine's model and the contract rank is read out of the table 29D that lists model-specific maintenance ranks. On the other hand, the maintenance actual result value of the machine is read out of the number-specific data table 27D of the maintenance management data table. Furthermore, the determination means comprises a means for calculating a dividend under the condition that the maintenance actual value is smaller than the maintenance predicted value and the difference between them exceeds the predetermined value.

[Maintenance Management Method for Machine Itself]

At first, we will describe the method of managing the maintenance of a machine M1 that belongs to a user C1 by an agent Dn.

The agent Dn or the user C1 enters data through an input means 11. The data may include a customer name (name of the user C1), model (model of the machine M1), specifications, individual machine number, time information (day-month, time, accumulated operation time, operation time), and so on. After the input of data, the operating conditions and usage conditions of the machine M1 are entered.

The operation environmental conditions may include the feature of location where the machine M1 is actually operated, for example sandy, highland, or sloping areas), so that the agent Dn or the user C1 may select an appropriate area and enters thereof through the input means 11.

The usage conditions, for example those of the machine M1 may include the model of fuel used, sulfur content, the model of lubricating oil, and so on.

Subsequently, the input information is transmitted to a server SV by the control means through a computer network 1, while the measurement information obtained by the state-measuring means 15 is periodically transmitted to the server SV through the computer network 1.

Figure 10:
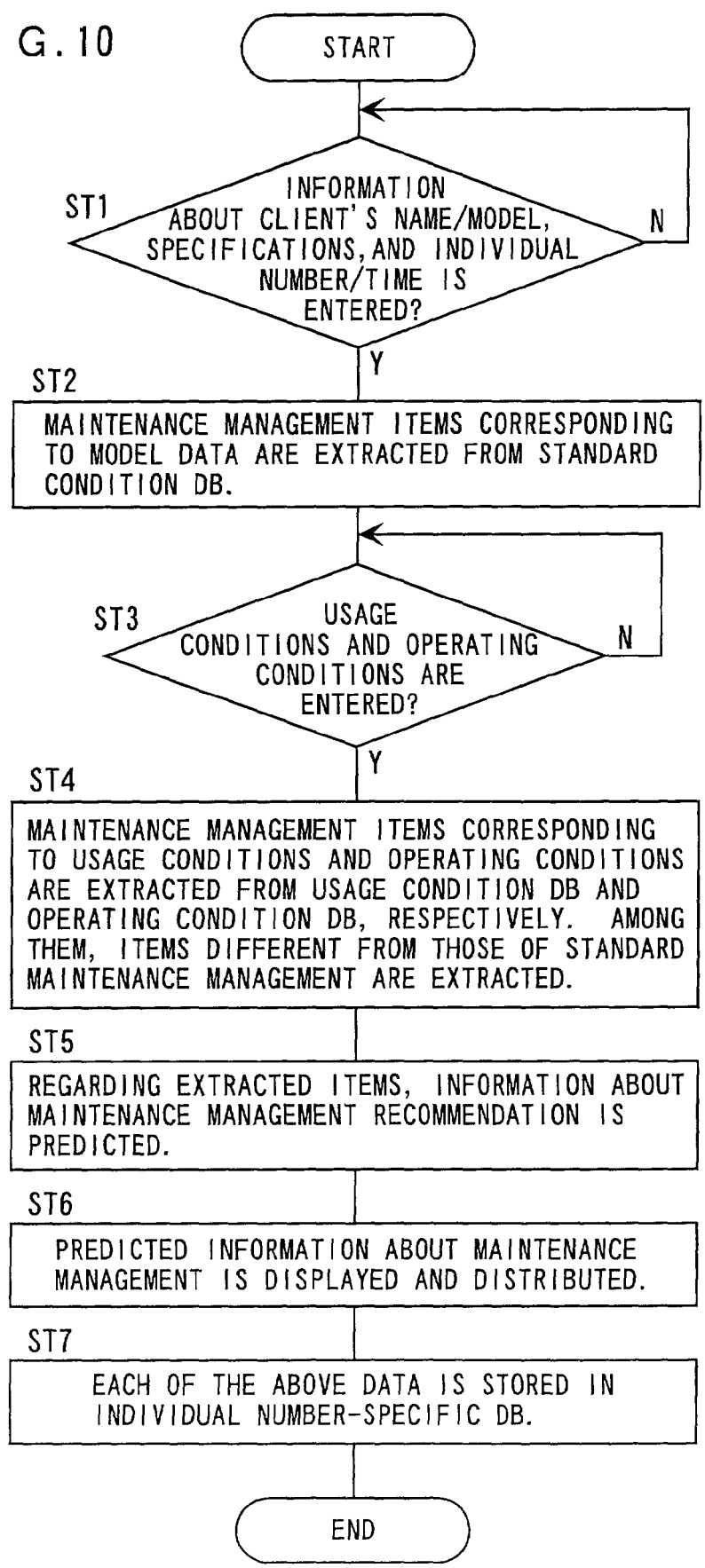
FIG. 10 is a flow chart that illustrates a series of steps of the predetermined process performed in the server provided in the system of machine management in accordance with the first preferred embodiment of the present invention.

In the server SV, the information is processed along the flow chart shown in FIG. 10.

In the step 1 (ST1), it is checked whether the data is entered. The data includes a customer name (name of the user C1), model (model of the machine M1), specifications, individual machine number, time information (day-month, time, accumulated operation time, operation time), and so on. If the data is entered, then the process proceeds to the step 2 (ST2). In the ST2, the maintenance control item table that copes with model data among the input data is extracted from the standard condition DB. In other words, the maintenance control item tables 23A–23C that copes with the model data that correspond to the model-specific data are extracted from the standard conditions 23A to 23C shown in FIG. 3. Accordingly, the parts and services required under the standard conditions can be extracted with respect to the input model data.

In the step 3 (ST3), it is confirmed that the operating conditions and usage conditions are entered. If these conditions are entered, then the process proceeds to the step 4 (ST4).

In the step 4 (ST4), tables 24A to 24C, 25A to 25C, which list maintenance management items, are extracted from the usage condition DB and the operation environment condition DB, such that extracted items correspond to the above input conditions. Among them, the extracted items are different from those of the table of maintenance management items in the standard condition DB. Therefore, the required parts and services under the above input conditions are extracted.

In the step 5 (ST5), for each of extracted items, the maintenance management recommendation information at each operation time is predicted.

For example, the maintenance management recommendation information with respect to the time or replacing each part and the time of performing over haul is performed on the basis of the conditions defined about the extracted table of maintenance management item table and the input accumulated operation time of the machine. At this time, the measurement information transmitted from the state-measuring means 15 through the user client terminal CT1 may be also referenced to predict the maintenance management recommendation information.

The time of part-replacement can be predicted as follows. In this case, data shown in FIG. 11A and FIG. 11B is used. FIG. 11A is a graphic diagram that illustrates a replacement probability for each part, where a horizontal axis indicates an operation time and a vertical axis indicates a characteristic value for every part. As shown in the figure, the replacement probability for each part is represented by the line with different slopes a2, a3, a1, d1, d2 depending on the operating conditions and the usage conditions. That is, the operation time until the limit of part-replacement becomes short as the inclination of each part-replacement probability line a1, a2, a3, d1, d2, d2 becomes large.

FIG. 11B is a graphic diagram that illustrates the useful line of each part, where a horizontal axis indicates an operation time and a vertical axis indicates the replacement probability for each part. In the figure, the lines a, d are part useful time distribution curves that corresponds to the part-replacement probability lines a1 to a3 and d1 to d2 of FIG. 11A, respectively.

For making a judgment whether parts need to be replaced, an instruction is issued for notifying the user or the agent to replace the part with new one when the operation time reaches 95% value of the part life distribution curves a, d that correspond to the operating conditions and the usage conditions, which have been entered. Depending on the operation environment and the usage conditions, it is possible to recommend using a high quality part as maintenance management recommendation information with respect to the part having a lager incrimination of the part-replacement probability line on the basis of the operation environmental conditions and the usage conditions.

In the step S6 (ST6), the maintenance management recommendation information obtained by the process at the step 5 (ST5) is represented on the display means and simultaneously sent to each of the client terminals CT1, DT through the computer network 1.

FIG. 12 illustrates an example of display screen that represents the maintenance management recommendation information obtained by the process executed in ST5. On the display screen shown in FIG. 12, there are the contents of the next round of recommendation (i.e., information about the subsequent recommending maintenance management). That is, the upper part of the screen indicates the need for the replacements of oil and filter, the predicted machine-working time (e.g., service meter: 9,250) until such replacements will be needed, and the predicated maintenance time (e.g., Mar. 30, 2000), respectively. The middle part of the screen represents a remarks column. As shown in the figure, for example, there is described that the replacements of oil and filter are recommended. Furthermore, the lower part of the screen represents the predicted expenses for carrying out the contents of the recommendation described in the remarks column, i.e., the replacements of oil and filter. The predicted expenses are represented as "Option1" and "Option 2".

Furthermore, in the upper and lower parts on the left side of the screen shown in FIG. 12, the model, the data concerned about the features of the machine, and the operating conditions are represented. In the middle of the lower side of the screen, the usage conditions are represented. In the lower part on the right side of the screen, the measurement information is represented. In the upper part on the right side, the list of other screens is represented. The user or the agent may move from the present screen to another one by clicking the corresponding item in the list. By the way, the measurement information displayed on the screen indicates that a usual part of the machine and the degree thereof being presumed on the basis of the measurement information. In other words, the control means 30 of the server SV has a part-specific determination means that presumes the unusual part with reference to the measurement information provided from the state-measuring means 15 and determines whether the unusual part should be replaced with new one, followed by representing the result on the display means 20.

If the user or the agent cricks "Option 1" or "Option 2" of the predicted expenses on the screen shown in FIG. 12, the detailed information about "Option 1" or "Option 2" appears on the screen. In other words, the control means has the functions of: estimating the required expenses under each conditions when the maintenance is performed on the basis of the predicted maintenance management information under several conditions; and representing the contents of the cost estimation on the display means 20. For estimating the costs precisely, in this case, the cost estimation may be performed using the price information DB shown in FIG. 8.

In the step 7 (ST 7), the various data described above is stored in the number-specific DB.

By the way, if the predicted maintenance management recommendation information is much different from the maintenance conditions of the maintenance management items stored in the standard DB, the operation environment condition DB, and the usage condition DB, the control means 30 reconsiders the maintenance conditions stored in each DB and rewrites new contents into the DB such that the new values in the DB are more be closely analogous to the predicted values in the above information. That is, the control means 30 has a means for reconsidering the conditions of a part-replacement, which performs reconsideration of maintenance replacement conditions among the whole maintenance conditions stored in the storage means 23 to 25 with reference to both the maintenance conditions stored in the storage means 23 to 25 and the predicted maintenance management recommendation information.

[Method of Managing Maintenance Contract]

Figure 15:
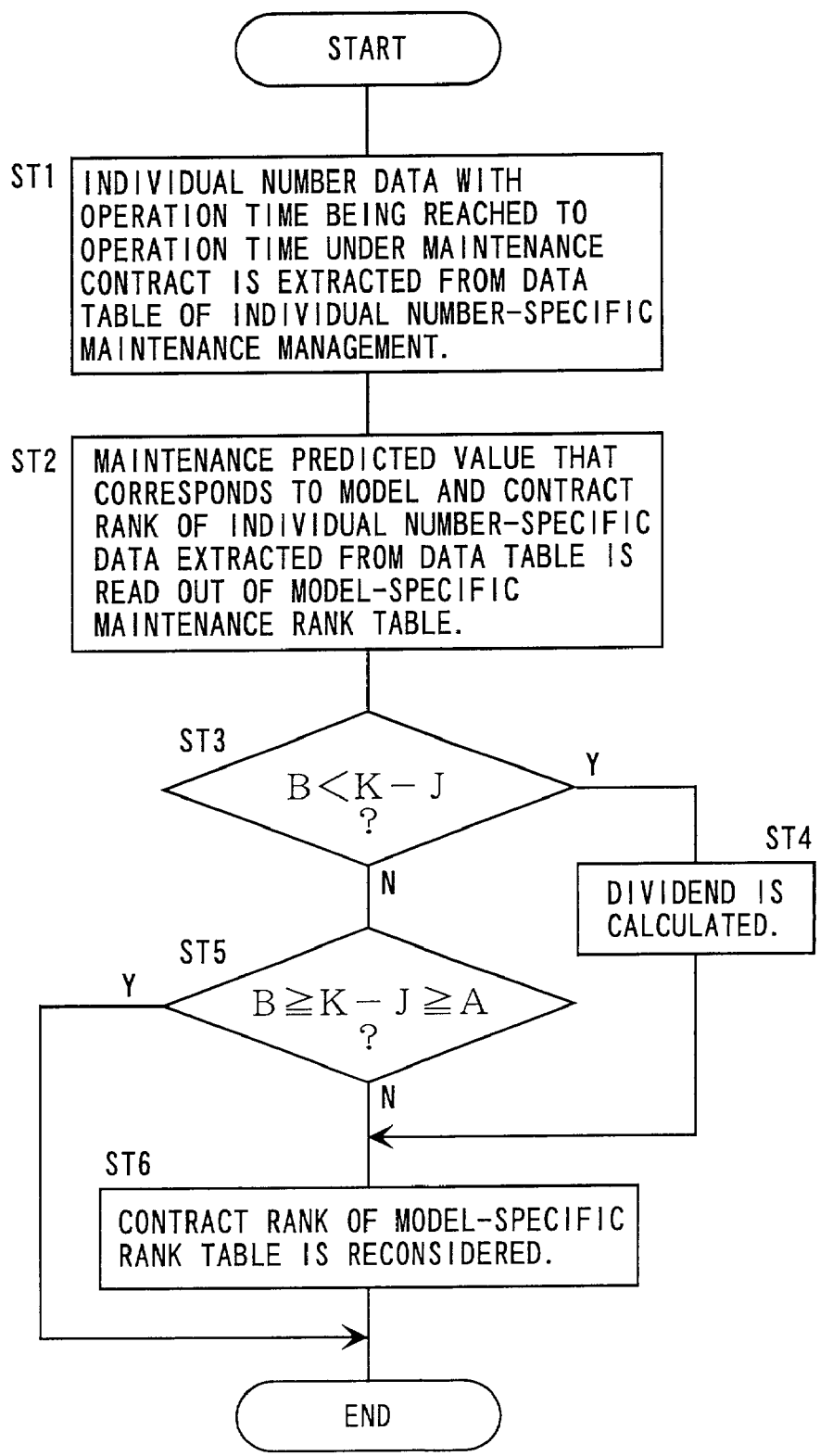
FIG. 15 is a flow chart that illustrates a series of steps of another predetermined process performed in the server provided in the system of machine management in accordance with the first preferred embodiment of the present invention.

Referring now to FIG. 14 and FIG. 15, we will describe the case in which the agent Dn makes a maintenance contract with the user C1 having the machine 1 and performs a maintenance management of the machine M1.

At the time of making the maintenance contract, if the agent client terminal Dn requests the server SV to provide the model-specific maintenance rank table 29D, the server SV replies the request and sends the desired table 28D to the client terminal Dn, followed by representing the table 28D on the display means 12.

Here, the maintenance contract is conducted while checking the items listed in the table 29D on the screen of the display means 12, such as models (A to Z) and contract ranks (R1 to R4). For determining the contract rank, the user C1 or the agent Dn may consider the usage conditions and the operating conditions of the machine M1 and may select the contract rank that suits these conditions, followed by entering the contents of the maintenance contract into the display screen through the input means 11. The input items include a given individual number or a model name of the machine M1, a contract rank, a start date of maintenance contract, an operation time under the contract, and operating conditions. Then, the input data is transmitted to the server SV through the computer network 1 and stored in the number-specific maintenance management data table 27D.

On the server's side, tables 23A to 23C that list maintenance management items corresponding to the model-specific data are extracted from the standard condition DB. Subsequently, tables 24A to 24C and 25A to 25C that list maintenance management items corresponding to the input operating conditions and the input usage conditions are extracted from the operation environment condition DB and the usage condition DB. Among them, items that are different from those in the tables 23A to 23C in the standard condition DB are extracted and replaced with the tables 23A to 23C in the standard condition DB. Therefore, parts or services to be required under the input operating conditions and the usage conditions are extracted. According to the results of the extraction, the maintenance management recommendation information at each operation time (e.g., information of recommending the replacement of a part at a certain operation time) is estimated, followed by transmitting Such information to each of client terminals DT, CT1, CT2.

On the agent's side, a maintenance service is performed on the basis of the above information. Each time, the expenses are entered through the input means 11. The operation time is also periodically entered. Then, these data are transmitted to the server SV through the computer network 1 and stored in the table 27D for the number-specific maintenance management.

The actual result value J to be accumulated in a maintenance actual value [J] column of the model-specific maintenance management data table 27D gradually increases as the operation time (or contract term) of the machine M1 increases. As shown in FIG. 14, for example, the maintenance actual result value J increases as the operation time H of the machine M1 increases. A portion where the maintenance actual result value J is gradually increased indicates that a normal maintenance work is performed, while another portion where the maintenance actual result value J is sharply increased indicates that a high-cost work such as over haul (e.g., engine) or repair of a component is performed.

In FIG. 14, by the way, "K" denotes a maintenance predicted value, which is the sum total of predicted expenses to be required to the maintenance. Also, each of "A" and "B" denotes the difference between the maintenance predicted value K and a predetermined value that is previously defined on the minus side with respect to the value K. In this case, the value A is smaller than the value B.

On the other hand, on the server's side, the process shown in FIG. 15 is performed on the machine when the operation time reaches one defined in the maintenance contract with respect to the given individual number.

In the step 1 (ST1), the number-specific data of the machine having the operation time that reaches one defined in the maintenance contract is extracted from the number-specific maintenance management data table 27D.

In the step 2 (ST2), the maintenance predicted value corresponding to a model of the extracted number-specific data and the contract rank is read out of the model-specific maintenance rank table 29D.

In the step 3 (ST3), it is judged whether the difference between the contract predetermined value K and the contract actual result value J exceeds the predetermined value B (i.e., the calculation of B<K–J is performed). If the result is B<K–J, then the process proceeds to the step 4 (ST4). If it is B≧J–J, then the process proceeds to the step 5 (ST5).

In the step 4 (ST4), a dividend is calculated. In this case, the difference between the maintenance predicted value K and the maintenance actual result value J may be used as the dividend without any modification. Alternatively, a predetermined proportion of the above difference may be provided as a dividend. After that, the process proceeds to the step 6 (ST6).

In the step 5 (ST5), it is judged whether the difference between the maintenance predicted value K and the maintenance actual result value J is within the range of the predetermined values A and B. That is, the calculation of "B≧(K–J)≧A" is performed. If "B≧K–J≧A" holds true, then the process is terminated. If it is not realized, the process proceeds to step 6 (ST6).

In the step 6 (ST6), the contract rank of the model-specific maintenance rank table 29D is redefined. If the difference between the maintenance predicted value K and the maintenance actual result value J equals to or exceeds the predetermined value A, it is considered that it is not in an allowable limit of error. In this case, therefore, the contract rank of the table 29D is redefined. Concretely, the contract rank of the table 29D is moved up or down with respect to the usage conditions and the operating conditions of the machine stored in the table 27D of the number-specific maintenance management data. That is, the contract rank is moved up or down such that the maintenance predicted value K gets close to the maintenance predicted value J. Therefore, the next maintenance contract can be contracted using the redefined contract rank.

If the maintenance predicted value K exceeds the maintenance actual result value J, the contract rank may be redefined. Therefore, the next maintenance contract can be contracted using the redefined contract rank.

[Effects of the Embodiments]

(1) The server SV extracts the maintenance management item table that corresponds to the model data, the operational surrounding conditions, and the usage conditions of machines M1 and M2, which were transmitted from each of the client terminals CT1, CT2, and DT. On the basis of the maintenance conditions specified on this maintenance management item table, the maintenance management recommendation information within the predetermined operation time of the machine M1, M2 is predicted. The predicted maintenance management recommendation information is displayed on the display means 20.

Therefore, the optimum maintenance management recommendation information in which each of the operational surrounding conditions and the usage conditions of the machine M1, M2 is taken into consideration can be acquired easily, without applying a burden to the user or the agency. Therefore, management work of the machine on the user's side or the agency's side also becomes easy. Especially, management schedules, such as repair and overhaul, can also be stood easily. Therefore, the information of machine management is realizable. And the whole expenses of the machine during its lifetime can also be predicted.

(2) In the server SV, the machines M1 and M2 belonging to the respective users C1 and C2 are manageable together. Therefore, the maintenance management can be performed without causing any burden (e.g., the burden accompanied by equipment, and burden accompanied by management work) to the users C1 and C2 who owns machines and the agency that takes charge of maintenance and so on. Therefore, the cost for maintenance management can also be reduced.

(3) For predicting the maintenance management recommendation information, in consideration of the measurement information on machines M1 and M2 generated as the output from state-measuring means 15 that measures the state of machines M1 and M2, the maintenance management recommendation information is optimized. It can raise the reliability of maintenance management recommendation information. Therefore, it can contribute also to reduction of management cost.

(4) The unusual part of the machine M1, M2 is presumed on the basis of the measurement information on the machine M1, M2 generated as the output from the state-measuring means 15. Then, it is judged whether the part should be replaced on the basis of the state of an actual machine. Therefore, before the predicted time, if the unusual part of the machine M1, M2 is caused at time even before the predicted time, the part-replacement may be performed before the predicted time.

(5) When the predicted maintenance management recommendation information and the maintenance conditions of a maintenance management item table being stored in the standard DB, the operational surrounding condition DB, and the operating condition DB are much different, the maintenance conditions stored in each DB are redefined and rewritten to new values which are more approximate to the predetermined values. Therefore, more suitable information about the replacement of parts can be provided.

(6) The predicted maintenance management recommendation information is distributed to each of client terminals CT1, CT2, and DT. For example, the user can be demanded to perform the required maintenance management. Moreover, the agent can be requested to prepare required works or supply required parts. Furthermore, the maker is able to check the required parts and also adjust the production when stock runs short.

(7) If the predicted maintenance management recommendation information is realized according to some conditions, the cost estimation of required expense is performed in each condition, and the estimated contents are displayed on the display means 20. Therefore, the user can choose executable condition while checking the contents of cost estimation when the predicted maintenance management recommendation information is performed.

(8) After the expiration of the contract of the machine, the maintenance predicted value corresponding to the model and the contract rank 10 of the machine is read from the maintenance rank table organized by model 29D. Simultaneously, the maintenance actual result value J of the machine is read from the number-specific maintenance management data table 27D. Then, it judges whether the maintenance actual result value J is larger than the maintenance predicted value K. Therefore, if the maintenance actual result value J is much lower than the maintenance predicted value K, profits can be returned to the maintenance-receiving side and the contract rank is improved. Conversely, if the maintenance actual result value J exceeds the maintenance predicted value K, the burden of the both sides which make a maintenance contract can be adjusted properly by looking over a suitable contract rank again. Furthermore, the maintenance predicted value K and the maintenance actual result value J based on the cost that actually expensed in connection with maintenance are contrasted, so that a negotiation at the time of a future maintenance contract can be also performed easily.

(9) Especially, this system comprises the client terminals DT, CT1, and CT2" and the server SV connected to these client terminals DT, CT1, and CT2 through the network 1. Therefore, a businessperson only brings a client terminal and visits the buyer of a machine. Then, the business makes a maintenance contract with the buyer and enters defined items of the contract and the maintenance actual result value into the terminal while checking the contents of a maintenance contract. Therefore, the maintenance contract can be also made easily and simple. Furthermore, each client terminals DT, CT1, and CT2 do not need to have model-specific maintenance rank table 29D, the number-specific maintenance management data table 27D, the determination means, and so on. Therefore, the maintenance contract can be managed using a cost-effective general-purpose terminal.

(10) The contract rank of the maintenance rank table organized by model 29D is divided into two or more ranks according to the usage conditions and the operational surrounding conditions of the machine. Thus, the contents of the maintenance contract can be changeable, for example, depending on an installation location of the machine in sandy or highland area or cold or tropical district. Therefore, a maintenance contract can be made in consideration of those conditions.

(11) A dividend is calculated when the maintenance actual result value J is smaller than the maintenance predicted value K and the difference between them exceeds the predetermined value B (i.e., the actual maintenance cost is less than the maintenance predicted value and the difference between them is larger than the predetermined value). Then, the dividend is paid to the maintenance-receiving side. Therefore, the overpayment on the maintenance-receiving side can be canceled. Therefore, there is a big merit of returning the dividend to the contractor who uses the machine under better operation environment and usage conditions or the contractor with good handling of the machine.

(12) If the difference between the maintenance predicted value K and the maintenance actual result value J exceeds the predetermined value A (i.e., the maintenance actual result value J exceeds the tolerance level of the maintenance predicted value K), the contract rank of the model-specific maintenance rank table 29D is improved. The new contract rank will be entered at the time of the next maintenance contract. Therefore, a subsequent maintenance contract can be conducted more property.

(13) When redefining the contract rank of the model-specific maintenance rank table 29D, the usage conditions and the operation environmental conditions of the machine are taken into consideration. Therefore, the proper maintenance contract suitable for the situation of each machine can be made.

[Modified Embodiments]

In the above embodiment, the server SV comprises different storage means that store their respective databases of standard conditions, operating conditions, and user conditions. An additional database that stores maintenance management items that correspond to any combination of those databases may be allowable. In the above embodiment, furthermore, the measurement information from the state-measuring means 15 mounted on the machines M1, M2 is transmitted to the user client terminals CT1, CT2, respectively. Alternatively, the measurement information from the state-measuring means 15 may be transferred to the agent client terminal DT depending on the distance between the client and the agent.

In the above embodiment, furthermore, the agent client terminal DT receives the input information about the contents of maintenance contract such as an individual number and a model name of the machine, a contract rang, a stating date of the maintenance contract, an operation time under the maintenance contract, an operation time, user conditions, an operating conditions, a maintenance actual result value, and so on. After the expiration of the contract of the machine, the maintenance predicted value that corresponds to the model and the contract rank of such a machine is read out of the number-specific maintenance management data table 27D, while the maintenance actual result value of the machine is read out of the number-specific maintenance rank table 27D to determine the size of the maintenance actual value with respect to the maintenance predicted value. Alternatively, the saver SV may only hold the model-specific maintenance rank table 29D such that the agent client terminal DT may download the model-specific maintenance rank table from the server SC to make a judgment whether the maintenance actual result value is larger or smaller than the maintenance predicted value.

In the above embodiment, the maintenance contract is made on the basis of the operation time and then the maintenance predicted value K is compared with the maintenance actual result value J when the operation time reaches the operation time under the contact. Alternatively, the maintenance contract may be made on the basis of the term and the maintenance predicted value K may be compared with the maintenance result value J when the contract term is expired. In this case, the model-specific maintenance rank table 29D may store the maintenance predicted values in advance. These values relate to maintenance in the maintenance contract term of each of two or more contract ranks (R1 to R4) for each of the models (A to Z) of the respective machines. In addition, the number-specific maintenance management data table 27D may store an expiration date of the maintenance contract term (the day from the start of the contract to the end of the contract term) with respect to each individual number. Then, the control means 30 of the server SV may perform the process shown in FIG. 16. In the step ST11, the specified date (optional date) is entered. In the step ST12, the number-specific data that is expired at that specified date is extracted from the number-specific maintenance management data table 27D. Subsequently, the above processes of the ST2 to ST6 are performed.

Figure 16:
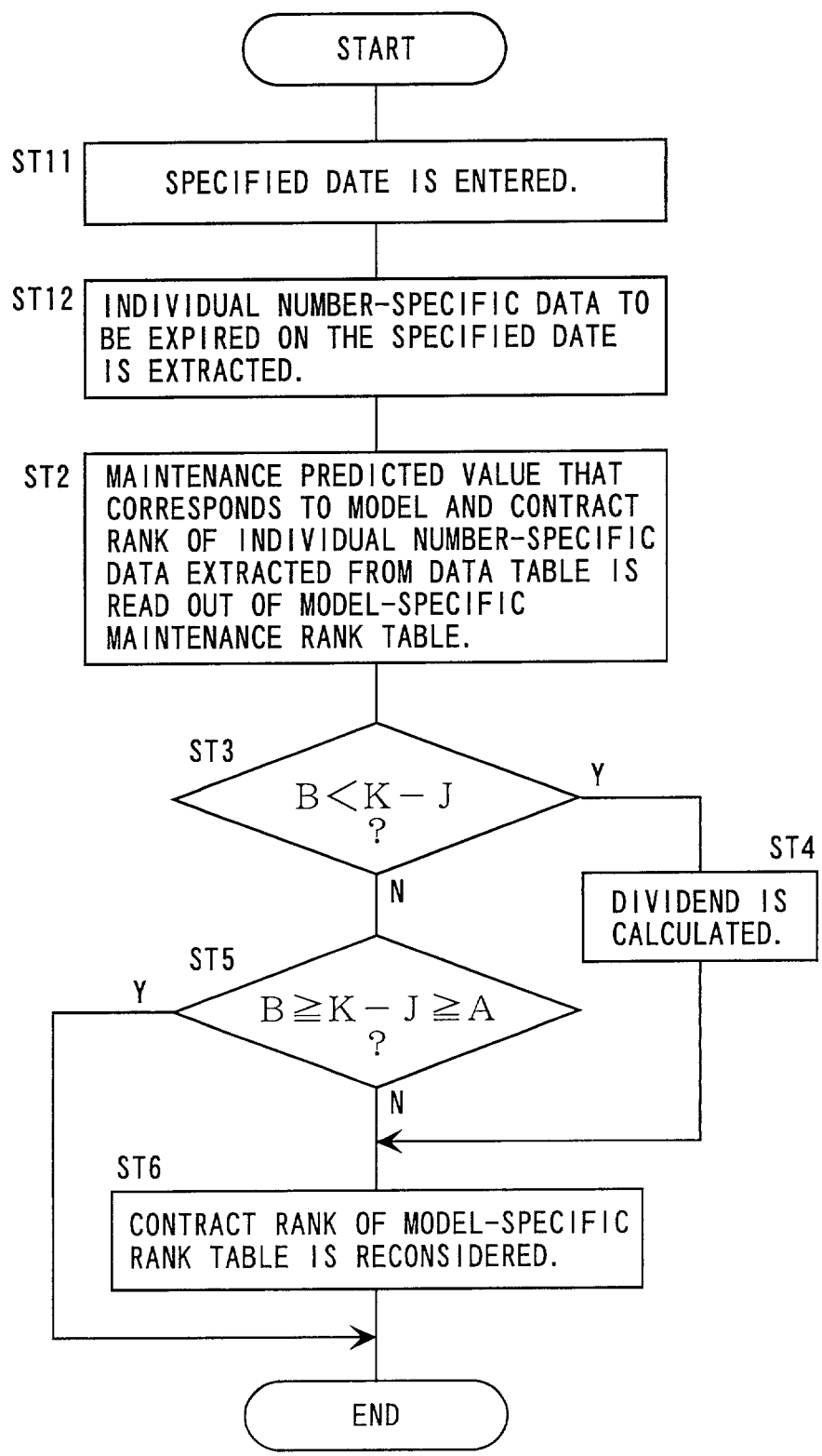
FIG. 16 is a flow chart that illustrates a series of steps of the process performed in a server in accordance with another preferred embodiment of the present invention.

In the above embodiment, the maintenance contract is made with the maintenance operation time under contract or the contract term, then the processes shown in FIG. 15 and FIG. 16 are executed on the basis of the operation time under contract or the contract term (expiration date). In the standard usage, as shown in FIG. 17, the contract term and the operation time under contract are in proportion. Thus, if one of them is provided as a standard, then the other can be obtained by the relationship shown in FIG. 17. Thus, one kind of model-specified maintenance rank table 29D allows that the maintenance contact corresponds to either the maintenance operation time under contract or the contract term. In this case, if the operation time is provided as a standard, then the latest operation time may be entered.

For example, the model-specific maintenance rank table 29D sets a maintenance predicted value in advance on the basis of the operation time under contract. If the maintenance contract is made with the contract term, the operation time under contract that corresponds to the contract term is calculated from the relation of FIG. 17. The maintenance predicted value corresponding to this operation time under contract may read out of the model-specific maintenance rank table 29D. Alternatively, the newest operation time is obtained to read the maintenance predicted value corresponding to the operation time from the model-specific maintenance rank table 29D.

On the other hand, each client terminals CT1, CT2, and DT may be a personal computer, a cellular phone, a personal digital assistants (PDA), and so on, having the browser function. If such a terminal is used, this system can be effectively used through a network even from places, such as a construction site where the communication circuit or the commercial power supply of a cable are not fixed.

Moreover, the system of the present invention consists of each client terminals CT1, CT2, and DT and the server SV, which were connected through the network 1. Alternatively, the system of the present invention may be realized using stand-alone model computers. Even in such a case, the same operational effects are expectable.

The recording medium of the present invention may be a hard disk or the like that makes up the storage means of each of the server and client terminals. In addition, an optical disc or the like, which is used to install any program into the hard disk, may be provided as a recoding medium of the present system. Moreover, the arbitrary recording media with which the computer program for performing this system is stored are included.

It is to be understood that the present invention is not limited to any particular management system of a construction machine. Rather, the invention is more generally applicable to any mobile- or fixed-model working machine, ordinary machine equipped with a driving-power source, or the like, in which it is desirable to manage its maintenance.

What claimed is:

1. A management system of a machine, comprising:
   a maintenance rank table organized by model that stores a maintenance prediction value with respect to a maintenance within a contract term for two or more contract ranks for each of one or more models;
   a means for inputting a model of machine that makes a maintenance contract, a contract rank, and a maintenance actual result value;
   a means for storing a maintenance actual result value, where the maintenance actual result value of the machine is accumulatively stored; and
   a means for determining whether a maintenance actual result value is larger than a maintenance prediction value corresponding to the machine's model and
   wherein the contract rank is read out of the maintenance rank table organized by model and the maintenance result value of the machine is read out of the means for storing the maintenance actual result value after an expiration of the contract of the machine.

2. A management system of a machine as claimed in claim 1, wherein:
   the means for determining includes a means to calculate a dividend when the maintenance actual value is lower than the maintenance predicted value and the difference between the maintenance actual value and the maintenance predicted value is higher than a predetermined value.

3. A management system of a machine as claimed in claim 1 wherein:
   the contract rank of the maintenance rank table organized by model is defined on the basis of usage conditions and operating conditions of the machine.

4. A management system of a machine, comprising:
   a client terminal and a server that connects to the client terminal through a network, wherein
   the client server includes an input means for entering a model of machine under a maintenance contract, a contract rank, and a maintenance actual result value, a display means, and a control means that requests data from the server and represents the data transmitted from the server on the display means; and
   the server includes a maintenance rank table organized by model that stores a maintenance predicted value with respect to a maintenance of each machine's model within a contract time for two or more contract ranks for each of one or more models, a means for storing a maintenance actual result value, which accumulatively stores the maintenance actual result value of the machine entered from the client terminal, and a means for determining whether the maintenance actual result value is larger than the maintenance predicted value after an expiration of the contract of the machine,
   wherein the maintenance predicted value, which corresponds to the machine's model and the contract rank, is read out from the maintenance rank table and the maintenance actual result value is read out from the means for storing the maintenance actual value.

5. A management method of a machine, comprising the steps of:
   storing a maintenance predicted value with respect to a maintenance in a maintenance rank table organized by model in a contract time period for two or more contract ranks for each of one or more models;
   storing the model of a machine under maintenance contract, contract rank, and maintenance actual result value, where the maintenance actual result value of the machine is accumulatively stored in a means for storing the maintenance actual result, reading the maintenance actual result value out of the means for storing the maintenance actual result value and reading a maintenance predicted value out of the machine maintenance rank table organized by model, where the maintenance predicted value corresponds to the machine's model and the contract rank after an expiration of the contract of the machine; and determining whether the maintenance actual result value is larger than the maintenance predicted value.

6. A management method of claim 5, wherein when the maintenance actual result value is smaller than the maintenance predicted value and a difference between these values is larger than a predetermined value, a dividend is calculated and paid.

7. A management method of claim 5, wherein the contract rank of the maintenance rank table organized by model is reconsidered when the difference between the maintenance actual result value and the maintenance predicted value is larger than a predetermined value, and a new contract rank is obtained by the reconsideration at the time of making a following maintenance contract, followed by using the new contract rank in the following maintenance contract.

8. A management method of claim 7, wherein when the contract rank in the maintenance rank table organized by model is reconsidered, usage conditions and operating conditions of the machine are considered in the process of reconsideration.

* * * * *